US012804523B2

(12) United States Patent
Sugiyama

(10) Patent No.: US 12,804,523 B2
(45) Date of Patent: Nov. 17, 2026

(54) NON-TERRESTRIAL NETWORK CELL INFORMATION REQUEST FOR CELL SELECTION/RESELECTION

(71) Applicant: Sharp Kabushiki Kaisha, Sakai City (JP)

(72) Inventor: Edward Masami Sugiyama, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 554 days.

(21) Appl. No.: 18/093,793

(22) Filed: Jan. 5, 2023

(65) Prior Publication Data

US 2024/0236820 A1 Jul. 11, 2024

(51) Int. Cl.
*H04W 48/16* (2009.01)
*H04B 7/185* (2006.01)

(52) U.S. Cl.
CPC ........ *H04W 48/16* (2013.01); *H04B 7/18513* (2013.01)

(58) Field of Classification Search
CPC . H04W 84/06; H04W 36/14; H04W 36/0055; H04W 36/06
See application file for complete search history.

(56) References Cited

U.S. PATENT DOCUMENTS

2017/0359757 A1* 12/2017 Lee .......................... H04J 11/00
2019/0097741 A1* 3/2019 Vlachou .............. H04B 17/318
2020/0100160 A1 3/2020 Pandey et al.
2021/0297149 A1* 9/2021 Hsieh ................. H04B 7/18589
2022/0015000 A1* 1/2022 Fujishiro ............... H04W 40/24
2022/0094834 A1* 3/2022 Schiller ...................... G01J 1/08
2023/0319929 A1* 10/2023 Shrestha ............... H04W 76/27 370/329
2024/0236802 A1* 7/2024 Sugiyama ........... H04W 36/083

FOREIGN PATENT DOCUMENTS

CN 110072250 A * 7/2019 ........ H04W 36/0083
WO WO-2023132767 A1 * 7/2023 ........ H04W 36/0094

OTHER PUBLICATIONS

3GPP TS 38.331 V17.2.0, NR; Radio Resource Control (RRC) protocol specification (Release 17) Sep. 2022.
InterDigital, "RRC Idle/Inactive measurement, mobility, and service continuity", 3GPP RAN WG2 Meeting #119-e, R2-2208277, Aug. 26, 2022.
MediaTek Inc., "Idle mode mobility for NTN-TN scenarios", 3GPP TSG-RAN WG2 Meeting #116-bis-e, R2-2200621, Jan. 25, 2022.
Nokia, Nokia Shanghai Bell, "Further view on Idle- and Connected-mode NTN mobility in Rel-18", 3GPP TSG-RAN WG2 Meeting #119bis Electronic, R2-2210353, Oct. 19, 2022.

* cited by examiner

*Primary Examiner* — Khalid W Shaheed
(74) *Attorney, Agent, or Firm* — Austin Rapp

(57) ABSTRACT

A wireless terminal is described. The wireless terminal includes transmitting circuitry configured to request non-terrestrial network (NTN) cell information from a core network node to determine a time for cell selection/reselection. The wireless terminal also includes receiving circuitry configured to receive the NTN cell information from the core network node.

2 Claims, 12 Drawing Sheets

NON-TERRESTRIAL NETWORK CELL INFORMATION REQUEST FOR CELL SELECTION/RESELECTION

TECHNICAL FIELD

The present disclosure relates generally to communication systems. More specifically, the present disclosure relates to non-terrestrial network cell information request for cell selection/reselection.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
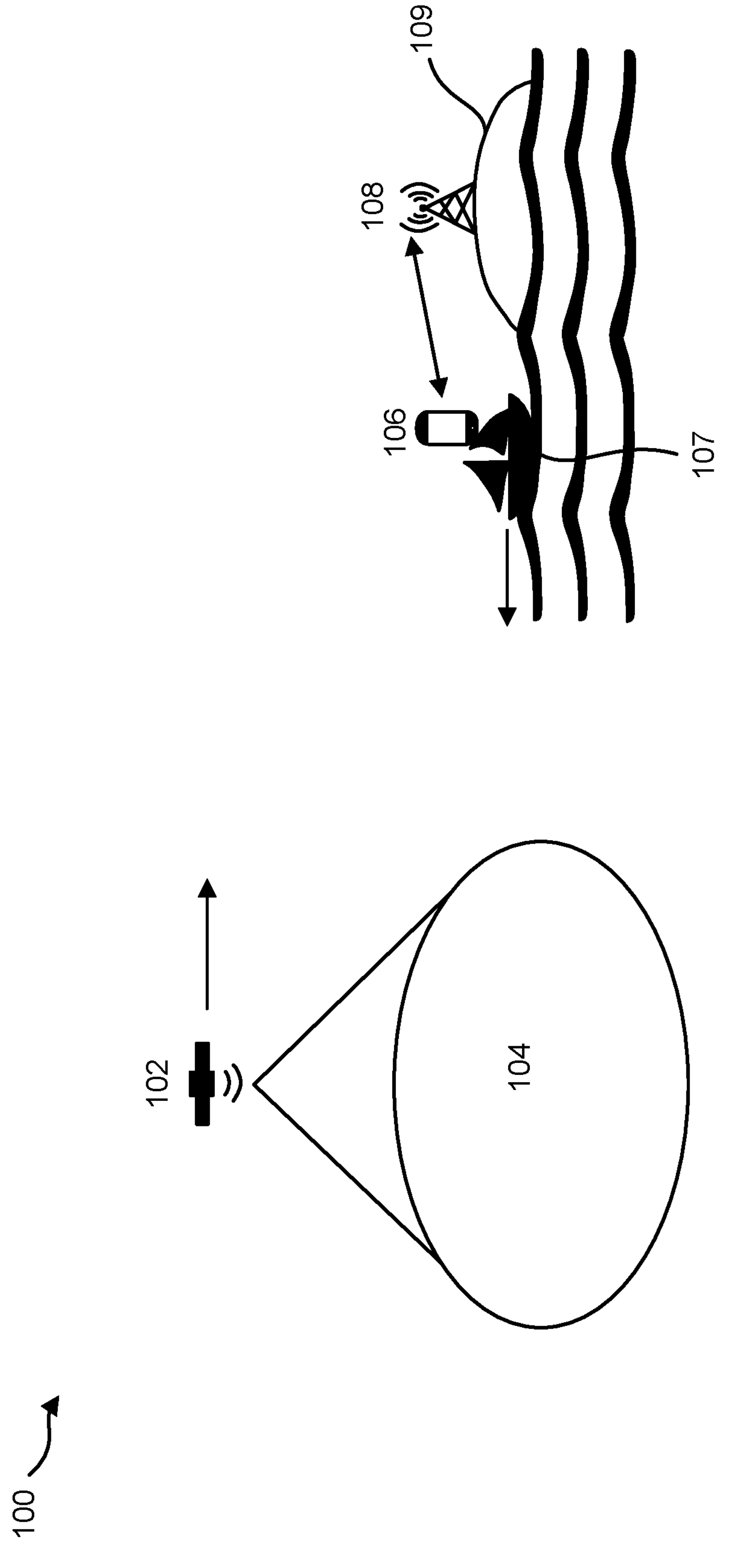
FIG. 1 is a diagram illustrating an example of non-terrestrial network (NTN) and terrestrial network (TN) in relation to water travel.

A wireless terminal is described. The wireless terminal may include transmitting circuitry configured to request non-terrestrial network (NTN) cell information from a core network node to determine a time for cell selection/reselection. The wireless terminal may also include receiving circuitry configured to receive the NTN cell information from the core network node.

The receiving circuitry may also be configured to select a NTN cell while camped on a terrestrial network (TN) cell without performing a cell search. In some examples, the wireless terminal may include receiving circuitry configured to reselect a NTN cell after signal loss of a terrestrial network (TN) signal while camped on a TN cell.

The NTN cell information may comprise NTN ephemeris and location assistance data, a NTN coverage start time or a NTN coverage start timer, and NTN cell configuration data.

In some examples, the request for NTN cell information may be sent after a terrestrial network (TN) received power signal strength is below a specified threshold.

A core network node is described. The core network node may include transmitting circuitry configured to transmit non-terrestrial network (NTN) cell information to a wireless terminal in response to a request received from the wireless terminal.

In some examples, the core network node may include memory having NTN position information and NTN orbital path information.

A method by a wireless terminal is described. The method may request non-terrestrial network (NTN) cell information from a core network node to determine a time for cell selection/reselection and may receive NTN cell information from the core network node.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a wireless terminal, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a wireless terminal. However, as the scope of the present disclosure should not be limited to the 3GPP standards, the terms "wireless terminal" and "wireless communication device" may be used interchangeably herein to mean the more general term "wireless communication device." A wireless terminal may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B." "eNB." "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a wireless terminal. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the wireless terminal is aware and is allowed by an eNB to transmit or receive information. "Configured cell(s)" may be serving cell(s). The wireless terminal may receive system information and perform the required measurements on all configured cells. "Configured cell(s)" for a radio connection may include a primary cell and/or no, one, or more secondary cell(s). "Activated cells" are those configured cells on which the wireless terminal is transmitting and receiving. That is, activated cells are those cells for which the wireless terminal monitors the physical downlink control channel (PDCCH) and in the case of a downlink transmission, those cells for which the wireless terminal decodes a physical downlink shared channel (PDSCH). "Deactivated cells" are those configured cells that the wireless terminal is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio." "New Radio Access Technology" or "NR" by 3GPP) envisions the use of time, frequency and/or space resources to allow for enhanced mobile broadband (eMBB) communication and ultra-reliable low-latency communication (URLLC) services, as well as massive machine type communication (MMTC) like services. To meet a latency target and high reliability, mini-slot-based repetitions with flexible transmission occasions may be supported. Approaches for applying mini-slot-based repetitions are described herein. A new radio (NR) base station may be referred to as a gNB. A gNB may also be more generally referred to as a base station device.

One important objective of 5G is to enable connected industries. 5G connectivity can serve as a catalyst for the next wave of industrial transformation and digitalization, which improve flexibility, enhance productivity and efficiency, reduce maintenance cost, and improve operational safety. Devices in such environments may include, for example, pressure sensors, humidity sensors, thermometers, motion sensors, accelerometers, actuators, etc. It is desirable to connect these sensors and actuators to 5G networks and core. The massive industrial wireless sensor network (IWSN) use cases and requirements include not only URLLC services with very high requirements, but also relatively low-end services with the requirement of small device form factors, and/or being completely wireless with a battery life of several years. The requirements for these services that are higher than low power wide area (LPWA) (e.g., LTE-MTC and/or Narrowband Internet of Things (LTE-M/NB-IOT)) but lower than URLLC and eMBB.

A non-terrestrial network (NTN) refers to a network, or segment of networks using radio frequency (RF) resources onboard a satellite (or UAS platform). Non-Terrestrial Network typically features the following elements: one or several sat-gateways that connect the Non-Terrestrial Network to a public data network. For example, a Geostationary Earth Orbiting (GEO) satellite is fed by one or several sat-gateways which are deployed across the satellite targeted coverage (e.g., regional or even continental coverage). It may be assumed that wireless terminals in a cell are served by only one sat-gateway. A Non-GEO satellite served successively by one or several sat-gateways at a time. The system ensures service and feeder link continuity between the successive serving sat-gateways with sufficient time duration to proceed with mobility anchoring and hand-over.

Additionally, Non-Terrestrial Network typically features the following elements: a Feeder link or radio link between a sat-gateway and the satellite (or Unmanned Aircraft System (UAS) platform), a service link or radio link between the wireless terminal and the satellite (or UAS platform).

Additionally, Non-Terrestrial Network typically features the following elements: a satellite (or UAS platform) which may implement either a transparent or a regenerative (with onboard processing) payload. The satellite (or Unmanned Aircraft System (UAS) platform) may generate several beams over a given service area bounded by its field of view. The footprints of the beams are typically of elliptic shape. The field of view of a satellite (or UAS platform) depends on the onboard antenna diagram and min elevation angle. For a transparent payload, radio frequency filtering, frequency conversion and amplification may be applied. Hence, the waveform signal repeated by the payload is un-changed. For a regenerative payload, radio frequency filtering, frequency conversion and amplification as well as demodulation/decoding, switch and/or routing, coding/modulation may be applied. This is effectively equivalent to having all or part of base station functions (e.g., gNB) onboard the satellite (or UAS platform).

Additionally, Non-Terrestrial Network may optionally feature the following elements: Inter-satellite links (ISL) optionally in case of a constellation of satellites. This will require regenerative payloads onboard the satellites. ISL may operate in RF frequency or optical bands.

Additionally, Non-Terrestrial Network typically features the following elements: User Equipment may be served by the satellite (or UAS platform) within the targeted service area.

There may be different types of satellites (or UAS platforms): Low-Earth Orbit (LEO) satellite, Medium-Earth Orbit (MEO) satellite, Geostationary Earth Orbit (GEO) satellite, UAS platform (including HAPS) and High Elliptical Orbit (HEO) satellite. Detailed descriptions are shown in Table-1.

TABLE 1

| Platforms | Altitude range | Orbit | Typical beam footprint size |
|---|---|---|---|
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (GEO) satellite | 35 786 km | Notional station keeping position fixed in terms of elevation/azimuth with respect to a given earth point | 200-3500 km |
| UAS platform (including HAPS) | 8-50 km (20 km for HAPS) | | 5-200 km |
| High Elliptical Orbit (HEO) satellite | 400-50000 km | Elliptical around the earth | 200-3500 km |

Typically, GEO satellites and UAS are used to provide continental, regional or local service. A constellation of LEO and MEO may be used to provide services in both Northern and Southern hemispheres. In some cases, the constellation can even provide global coverage including polar regions. For the later, this requires appropriate orbit inclination, sufficient beams generated and inter-satellite links.

Non-terrestrial networks may provide access to wireless terminal in six reference scenarios including: Circular orbiting and notional station keeping platforms, highest round trip delay (RTD) constraint, highest Doppler constraint, a transparent and a regenerative payload, one ISL case and one without ISL (Regenerative payload is mandatory in the case of inter-satellite links), fixed or steerable beams resulting respectively in moving or fixed beam foot print on the ground.

Wireless terminals, that may include New Radio (NR) may also support connections to both Terrestrial Network (TN) and Non-Terrestrial Network (NTN). If the wireless terminal is in a fringe coverage area without any TN neighbor cells the wireless terminal may experience repeated cycles of signal loss, cell search, and camp. In addition, an NTN cell may be approaching the wireless terminal that is camped on a TN cell in a fringe coverage area. Currently, the wireless terminal may continue executing cell searches until the NTN satellite coverage footprint is accessible by the wireless terminal. However, repeated cell searches for an unknown period of time are inefficient and also adds to wireless terminal power consumption.

If the wireless terminal is aware of the NTN cell information before the loss of TN signal, the wireless terminal may select the NTN cell during idle mode (camped) or reselect NTN cell after loss of TN signal. Furthermore, a reduction in cell searches may occur if the wireless terminal is aware of NTN cell information that may assist with cell selection/reselection. The wireless terminal may use the NTN cell information to camp on the NTN cell. If the wireless terminal fails to camp on the NTN cell, then the wireless terminal may search for other available cells to camp on.

This disclosure describes methods for wireless terminals to select/reselect NTN cell while camped to TN cell. Specifically:

A core network node that transmits Non-Terrestrial Network cell information to a wireless terminal A wireless terminal that receives NTN cell information and selects NTN cell while camped to a TN cell A wireless terminal that receives NTN cell information and reselects NTN cell after loss of TN signal while camped on a TN cell A wireless terminal that requests core network node for NTN cell information to determine optimum time for cell selection/reselection NTN satellites such as Low Earth Orbit (LEO) and Middle Earth Orbit (MEO) are constantly moving in an orbital path. As a result, the satellite coverage footprint area shifts with time.

FIG. 1 is a diagram 100 illustrating an example of NTN and TN in relation to water travel. A wireless terminal 106 is in or on a ship 107. The wireless terminal 106 is camped on TN cell 108 which may be on an island 109. Meanwhile, a satellite with NTN cell 102 and the satellite coverage footprint 104 may approach the ship 107 with the wireless terminal 106.

Figure 2:
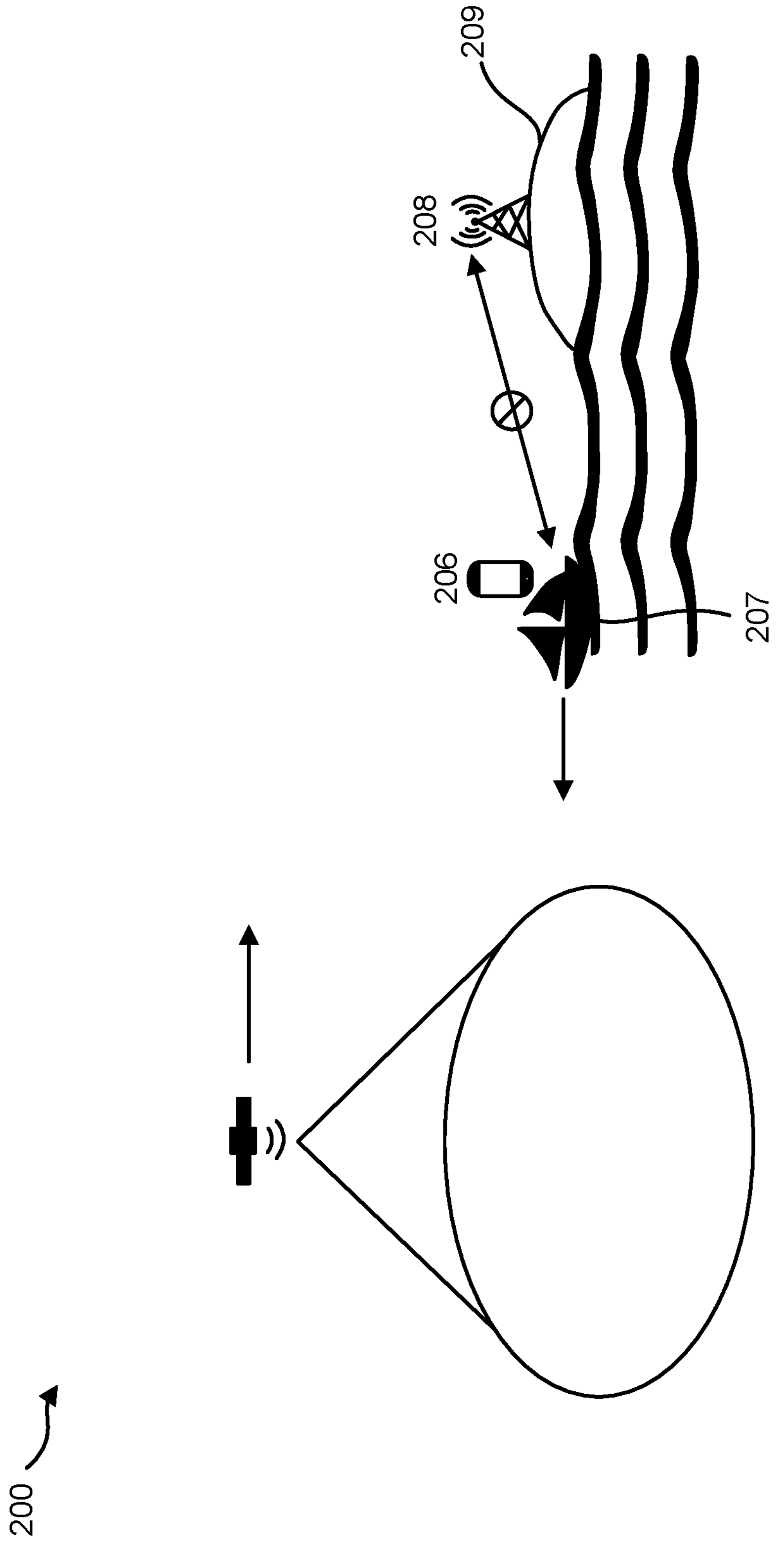
FIG. 2 is a diagram illustrating another example of NTN and TN in relation to water travel.

FIG. 2 is a diagram 200 illustrating another example of NTN and TN in relation to water travel. FIG. 2 illustrates that as the ship 207 moves away from the island 209, the wireless terminal 206 may no longer be camped on TN cell 208 due to signal loss. Because the wireless terminal 206 camped on a TN cell 208 may not detect NTN cell receive power level or NTN system information block (SIB) messages, only neighbor TN cells are detected if they are available. If TN neighbor cells are unavailable, the wireless terminal 206 will need to wait for TN cell signal loss before searching for NTN cells.

Figure 3:
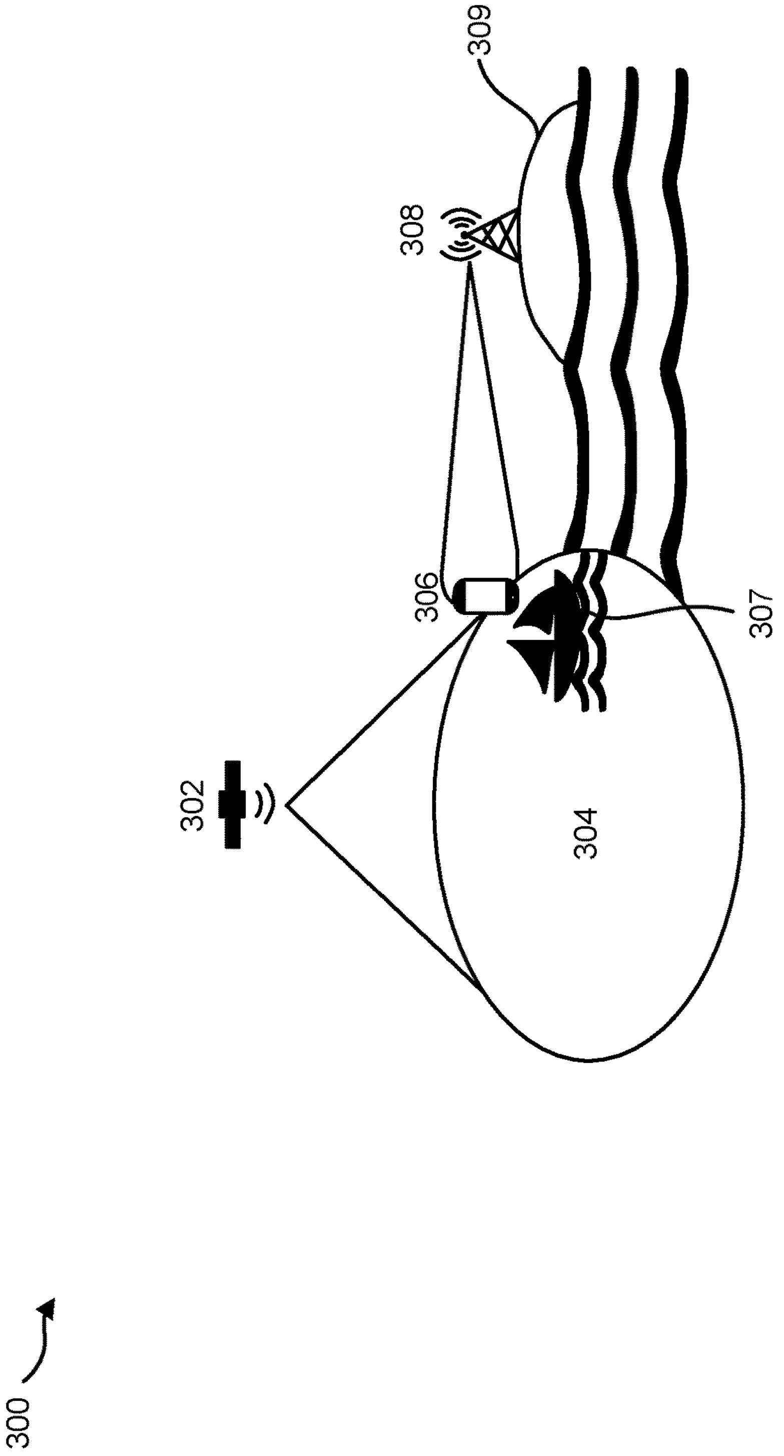
FIG. 3 is a diagram illustrating another example of NTN and TN in relation to water travel.

FIG. 3 is a diagram 300 illustrating another example of NTN and TN in relation to a wireless terminal 306 in or on a ship 307 travelling on water. FIG. 3 illustrates that even if NTN cell 302 is available, the wireless terminal 306 may not select the NTN cell 302 while camped on TN cell 308 on an island 309 or land mass 309. If NTN cell information is available before loss of TN signal, the wireless terminal 306 may be able to select and camp on the NTN cell 302. A reduction in cell searches may be achieved if the NTN cell information is already available to the wireless terminal 306.

The description herein describes that a wireless terminal may select/reselect NTN cell by utilizing core network node transmission of NTN cell information while reducing cell searches executed by wireless terminal.

Embodiment One

A method to select NTN cell while the wireless terminal is camped on TN cell may include core network node transmitting NTN cell information before signal/coverage loss. The transport mechanism of NTN cell information may include dedicated signaling such as radio resource control (RRC) or DLInformationTransfer. Because the core network node has information regarding position and orbital path of NTN satellites, the core network mode may determine that NTN satellite(s) may be approaching an area with TN cells. The NTN cell information associated with the NTN satellite may be transmitted to the wireless terminals that are camped to the specific TN cells that may be approached by the NTN satellite. The NTN cell information may include the following:

1) NTN ephemeris and location assistance data
2) Coverage Start Time/Coverage Start Timer
3) Cell configuration data and may include parameters such as Cell Id The wireless terminal may execute on the following once it receives the NTN cell information and transitions to idle/camped mode on a TN cell:

1) Attempt to camp on the NTN cell using the NTN PCI value that may be encapsulated in the NTN cell information.
2) Attempt to camp on the NTN cell at the coverage start time or expiration of coverage start timer.
3) Calculate coverage start time using the NTN ephemeris data along with the location data of the wireless terminal. Calculation of coverage start time may be necessary if the wireless terminal is also moving.

If the wireless terminal experiences a signal loss before the coverage start time or expiration of coverage start timer, the wireless terminal may wait until the coverage start time before attempting to camp on the NTN cell. Waiting for coverage to start prevents excess cell searches especially if no TN cells are available.

If the wireless terminal is moving, a more accurate coverage start time may be calculated by the wireless terminal. The ephemeris and assistance location data provided in the NTN cell information may be used for determining NTN coverage time. Once coverage time has been calculated, the wireless terminal may wait until the coverage start time to select the NTN cell.

Figure 4:
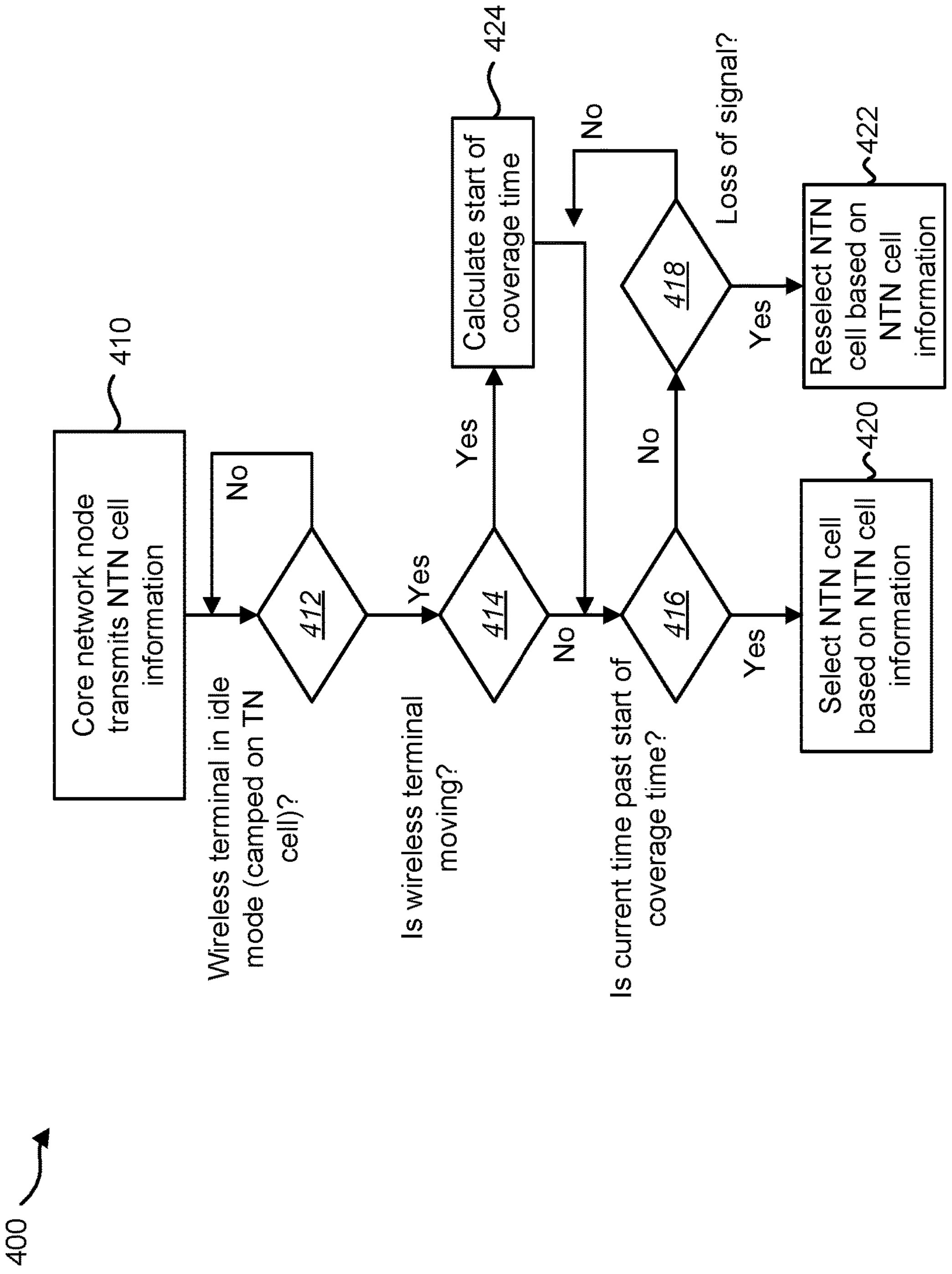
FIG. 4 is a flow diagram depicting steps performed by a wireless terminal after the core network node transmits NTN cell information.

FIG. 4 is a flow diagram 400 depicting steps performed by a wireless terminal after the core network node transmits 410 NTN cell information. It is then determined 412 whether the wireless terminal is in idle mode (camped on TN cell). Once the wireless terminal is camped back on TN cell but not in connected mode, a check 414 for movement (location shift) is performed. If the wireless terminal is moving, then the wireless terminal may calculate 424 updated start time of coverage using the ephemeris/location assistance data in the NTN cell information. The start time of coverage may be compared 416 to current time and if current time is past the coverage start time, the wireless terminal may start 420 the NTN cell selection process based on the cell configuration data that is encapsulated in the NTN cell information message transmitted by the core network node. As an alternative to comparing 416 start time of coverage to current time, the coverage start timer expiration may be checked to determine NTN cell selection process. However, if it is determined 418 that a loss of signal occurs before the coverage start time, the wireless terminal may start 422 the NTN cell reselection process using cell configuration data.

Listing 1 is an example implementation of NTN cell information transported using signaling message. The example in this case uses rrcRelease message. The rrcRelease message may include Information Elements (IE) of NTN cell that originated from the core network node. Furthermore, after rrcRelease, the wireless terminal will transition to idle mode or camped on TN cell.

Listing 1

```
-- ASN1START
-- TAG-RRCRELEASE-START
RRCRelease ::=                                  SEQUENCE {
   rrc-TransactionIdentifier                       RRC-
TransactionIdentifier,
      criticalExtensions                           CHOICE {
         rrcRelease                                   RRCRelease-IEs,
         criticalExtensionsFuture                     SEQUENCE { }
      }
}
RRCRelease-IEs ::=                              SEQUENCE {
.....
RRCRelease-vxxxx-IEs ::=                        SEQUENCE {
      ntnCellInfoAvailable                      ENUMERATED {true}
OPTIONAL, -- Need N
      ntnSatelliteInfo                          ntnSatelliteInfo
OPTIONAL, -- Need
ntnSatelliteInfoList ::= SEQUENCE (SIZE (1..maxSat)) OF
ntnSatelliteInfo }
ntnSatelliteInfo ::= SEQUENCE {
      satelliteSAI-r17                      CHOICE {
      sgp4EphemerisParameters-r17              SGP4EphemerisParameters
      earthFixedCellParameters-r17
   EarthFixedCellParameters
      nonCriticalExtension                     SEQUENCE { }
      }
      satelliteID-r17                          INTEGER (0..255)
   OPTIONAL,
      satelliteFootprintParameters-r17
   SatelliteFootprintParameters-r17                    OPTIONAL,
      nonCriticalExtension                     SEQUENCE { }
   OPTIONAL,
}
```

-continued

Listing 1

```
    EarthFixedCellParameters-r17 ::= SEQUENCE {
    t-ServiceStart-r17                  SEQUENCE( SIZE (1..10)) OF
INTEGER (0..1048575)
    nonCriticalExtension               SEQUENCE { }
}
SGP4EphemerisParameters-r17 ::= SEQUENCE {
        inclination-r17            INTEGER (0..2097151)
        periapsis-r17              INTEGER (0..2097151)
        longitude-r17              INTEGER (0..4194303)
        anomaly-r17               INTEGER (0..4194303)
        eccentricity-r17           INTEGER (0..16777215)
        meanMotion-r17            INTEGER (0..17179869183)
        revNoEpoch-r17             INTEGER (0..131071)
          bStar-r17               BIT STRING (23)
        epochStar-r17             INTEGER (−1048575..1048575)
}
SatelliteFootprintParameters-r17 ::= SEQUENCE {
    elevationAngleR-r17              INTEGER (−7..7)          OPTIONAL,
    elevationAngleL-r17              INTEGER (−7..7)          OPTIONAL,
    refPointX-r17                  INTEGER (X1..X2)        OPTIONAL,
    refPointY-r17                  INTEGER (Y1..−Y2)       OPTIONAL,
    refRadius-r17                    INTEGER (1..200)
  OPTIONAL,
    nonCriticalExtension             SEQUENCE { }         OPTIONAL,
}
ntnCoverageTimeInformation ::= SEQUENCE {
  ntnCoverageStartTime
}
ntnCellConfiguration ::= SEQUENCE {
    ntnCellid                  INTEGER (1..)              OPTIONAL,
    ntnCellParameters              SEQUENCE ( )          OPTIONAL,
    nonCriticalExtension             SEQUENCE { }         OPTIONAL,
}
    nonCriticalExtension                      RRCRelease
OPTIONAL
}
-- ASN1START
```

Embodiment Two

A wireless terminal camped on a TN may request for NTN cell information to the core network node. The wireless terminal may transmit to the core network node, a request message for any satellites that may be approaching the camped TN cell. In response, the network may transmit NTN cell information to the wireless terminal. The NTN cell information request may be transported via signaling messages that may include RRC messages. The wireless terminal may also transmit location information. The core network node may use the wireless terminal location information to determine if the incoming NTN satellite is within reach of the satellite coverage. The core network mode may also use the location information of the TN cell camped to the wireless terminal to determine coverage information. The core network node transmits back the NTN cell information. The NTN cell information may include the following:

1) NTN ephemeris and location assistance data
2) NTN Coverage Start Time/Coverage Start Timer
3) NTN Cell configuration data and may include parameters such as Cell Id The wireless terminal will use the NTN Cell configuration encapsulated in the NTN Cell Information to select new cell during idle or cell reselect after signal loss without performing a cell search or intra/inter frequency measurements.

Figure 5:
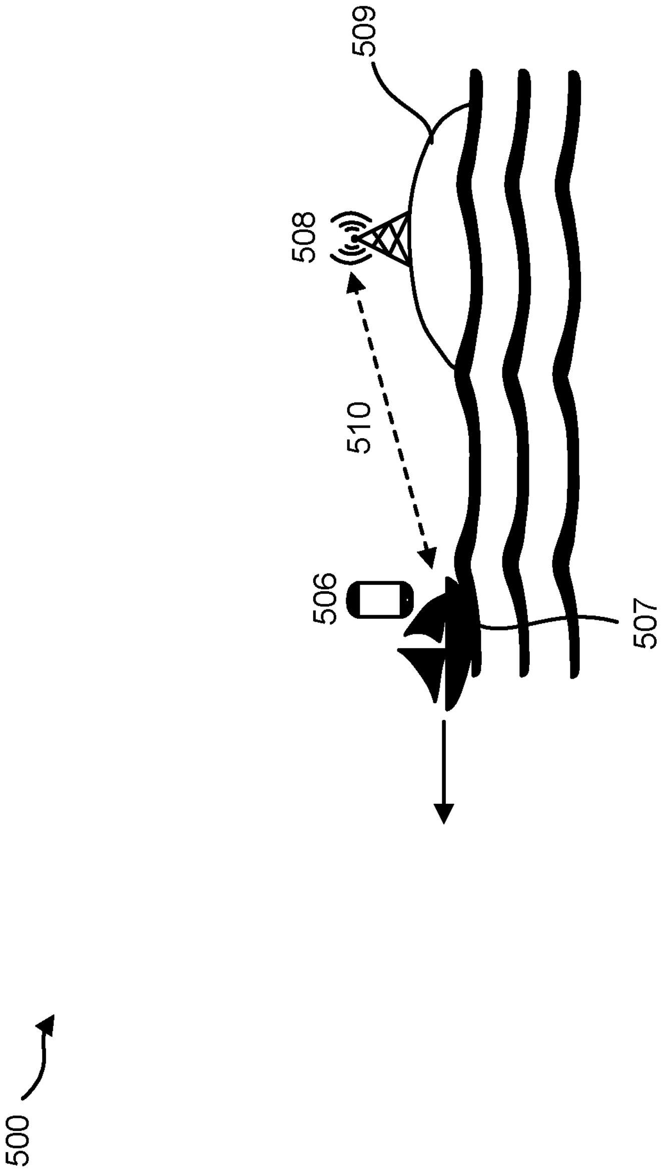
FIG. 5 is a diagram illustrating an example of a wireless terminal requesting NTN cell information.

FIG. 5 is a diagram 500 illustrating an example of a wireless terminal requesting NTN cell information. The wireless terminal 506 is shown on a ship 507 having a communication link 510 with a TN cell 508 on an island 509 or land mass 509. Because there are no other islands nearby, TN neighbor cells are not available. At some distance from the TN cell 508, the wireless network may experience repeated signal loss and acquisition, also known as fringe coverage area. To reduce cell searches, the wireless network may transmit a request for any approaching NTN cell. Because the request and response of NTN cell information requires the wireless terminal 506 to be in connected state, the wireless terminal 506 may monitor the TN received power signal strength and once the power level is below a specified threshold, the wireless terminal 506 may transmit an NTN cell information request and receive a response.

Once NTN cell information is received, the wireless terminal 506 may reduce the number of searches to perform after signal loss based on the wait time for NTN coverage. If the wireless terminal 506 is moving, then the wireless terminal 506 may want to periodically send a new NTN cell information request.

Listing 2

```
-- ASN1START
-- TAG-RRCRELEASE-START
ntnCellInformation-IEs ::=                SEQUENCE {
```

-continued

Listing 2

```
    ntnCellInfoAvailable                    ENUMERATED {true}
OPTIONAL, -- Need N
    ntnSatelliteInfo                        ntnSatelliteInfo
OPTIONAL, -- Need
ntnSatelliteInfoList ::= SEQUENCE (SIZE (1..maxSat)) OF
ntnSatelliteInfo }
ntnSatelliteInfo ::= SEQUENCE {
    satelliteSAI-r17                   CHOICE {
    sgp4EphemerisParameters-r17             SGP4EphemerisParameters
    earthFixedCellParameters-r17
  EarthFixedCellParameters
    nonCriticalExtension                 SEQUENCE { }
    }
    satelliteID-r17                      INTEGER (0..255)
  OPTIONAL,
    satelliteFootprintParameters-r17
  SatelliteFootprintParameters-r17                OPTIONAL,
    nonCriticalExtension                 SEQUENCE { }
  OPTIONAL,
}
    EarthFixedCellParameters-r17 ::= SEQUENCE {
    t-ServiceStart-r17                      SEQUENCE( SIZE (1..10)) OF
INTEGER (0..1048575)
    nonCriticalExtension                 SEQUENCE { }
}
SGP4EphemerisParameters-r17 ::= SEQUENCE {
        inclination-r17              INTEGER (0..2097151)
        periapsis-r17                INTEGER (0..2097151)
        longitude-r17                INTEGER (0..4194303)
        anomaly-r17                INTEGER (0..4194303)
        eccentricity-r17             INTEGER (0..16777215)
        meanMotion-r17             INTEGER (0..17179869183)
        revNoEpoch-r17               INTEGER (0..131071)
          bStar-r17                BIT STRING (23)
        epochStar-r17              INTEGER (−1048575..1048575)
}
SatelliteFootprintParameters-r17 ::= SEQUENCE {
    elevationAngleR-r17                  INTEGER (−7..7)           OPTIONAL,
    elevationAngleL-r17                  INTEGER (−7..7)           OPTIONAL,
    refPointX-r17                      INTEGER (X1..X2)         OPTIONAL,
    refPointY-r17                      INTEGER (Y1..−Y2)        OPTIONAL,
    refRadius-r17                          INTEGER (1..200)
  OPTIONAL,
    nonCriticalExtension                   SEQUENCE { }         OPTIONAL,
}
ntnCoverageTimeInformation ::= SEQUENCE {
  ntnCoverageStartTime
}
ntnCellConfiguration ::= SEQUENCE {
    ntnCellid                     INTEGER (1..)              OPTIONAL,
    ntnCellParameters                  SEQUENCE ( )           OPTIONAL,
    nonCriticalExtension                   SEQUENCE { }         OPTIONAL,
}
-- ASN1START
```

Listing 2 is an example implementation of NTN cell information transported from the core network node using signaling message. This message may be included in any signaling message that includes RRC but not System Information Block.

In the present systems and methods, a number of features are described, including (a) a core network node that transmits NTN cell information to a wireless terminal, (b) a wireless terminal that receives NTN cell information to determine NTN coverage start time, (c) a wireless terminal that selects NTN cell while camped on a TN cell without performing a cell search, (d) a wireless terminal that reselects NTN cell after signal loss of TN cell during idle/camped mode, (e) a wireless terminal that determines need for NTN cell information, and (f) a wireless terminal that transmits request for NTN cell information.

Figure 6:
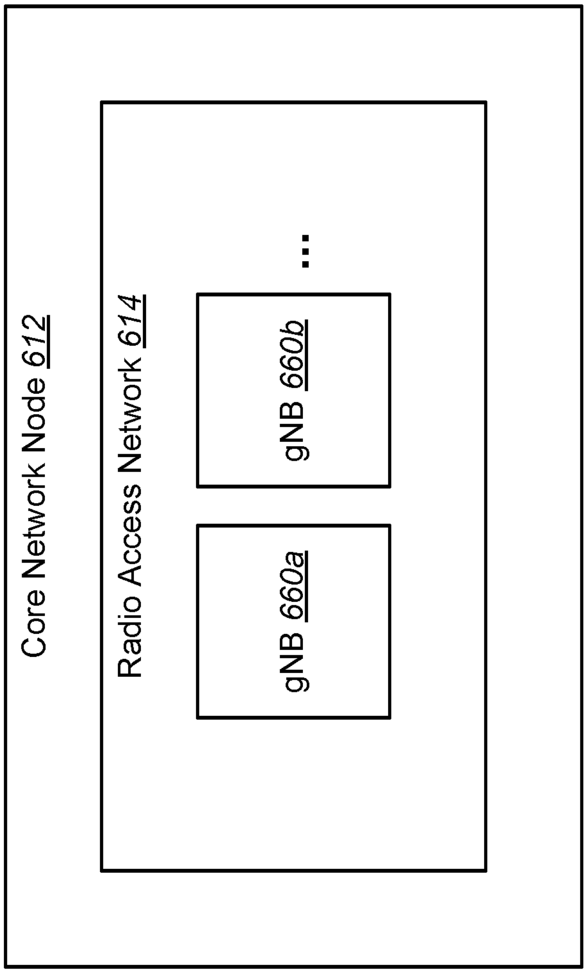
FIG. 6 is a block diagram illustrating one implementation of a core network node.

FIG. 6 is block diagram illustrating one implementation of a core network node 612. The core network node 612 may include a radio access network 614 that includes a plurality of gNBs (gNB 660*a*, 660*b*). Messages transmitted and received by the core network node 612 may be transmitted and received by the gNBs 660*a*, 660*b* in the radio access network 614.

Figure 7:
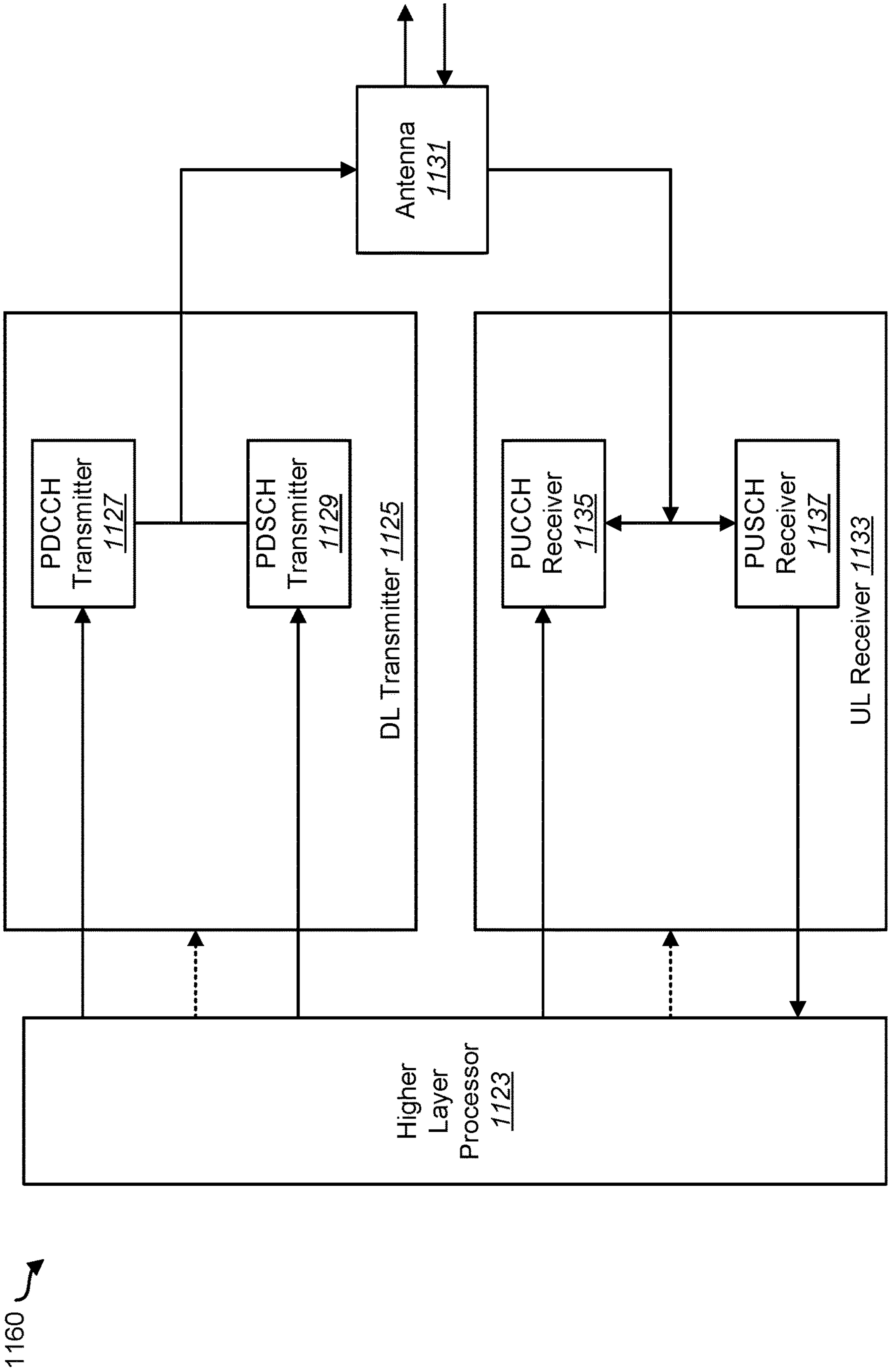
FIG. 7 is a block diagram illustrating one implementation of a gNB.

FIG. 7 is a block diagram illustrating one implementation of a gNB 1160. The gNB 1160 may include a higher layer processor 1123, a DL transmitter 1125, a UL receiver 1133, and one or more antenna 1131. The DL transmitter 1125 may include a PDCCH transmitter 1127 and a PDSCH transmitter 1129. The UL receiver 1133 may include a PUCCH receiver 1135 and a PUSCH receiver 1137.

The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send and/or acquire higher layer messages such as an RRC message and MAC message to and/or from a wireless terminal's higher layer. The higher layer processor 1123 may provide the PDSCH transmitter transport blocks and provide the PDCCH transmitter transmission parameters related to the transport blocks.

The DL transmitter 1125 may multiplex downlink physical channels and downlink physical signals (including reservation signal) and transmit them via transmission antennas 1131. The UL receiver 1133 may receive multiplexed uplink physical channels and uplink physical signals via receiving antennas 1131 and de-multiplex them. The PUCCH receiver 1135 may provide the higher layer processor 1123 UCI. The PUSCH receiver 1137 may provide the higher layer processor 1123 received transport blocks.

Figure 8:
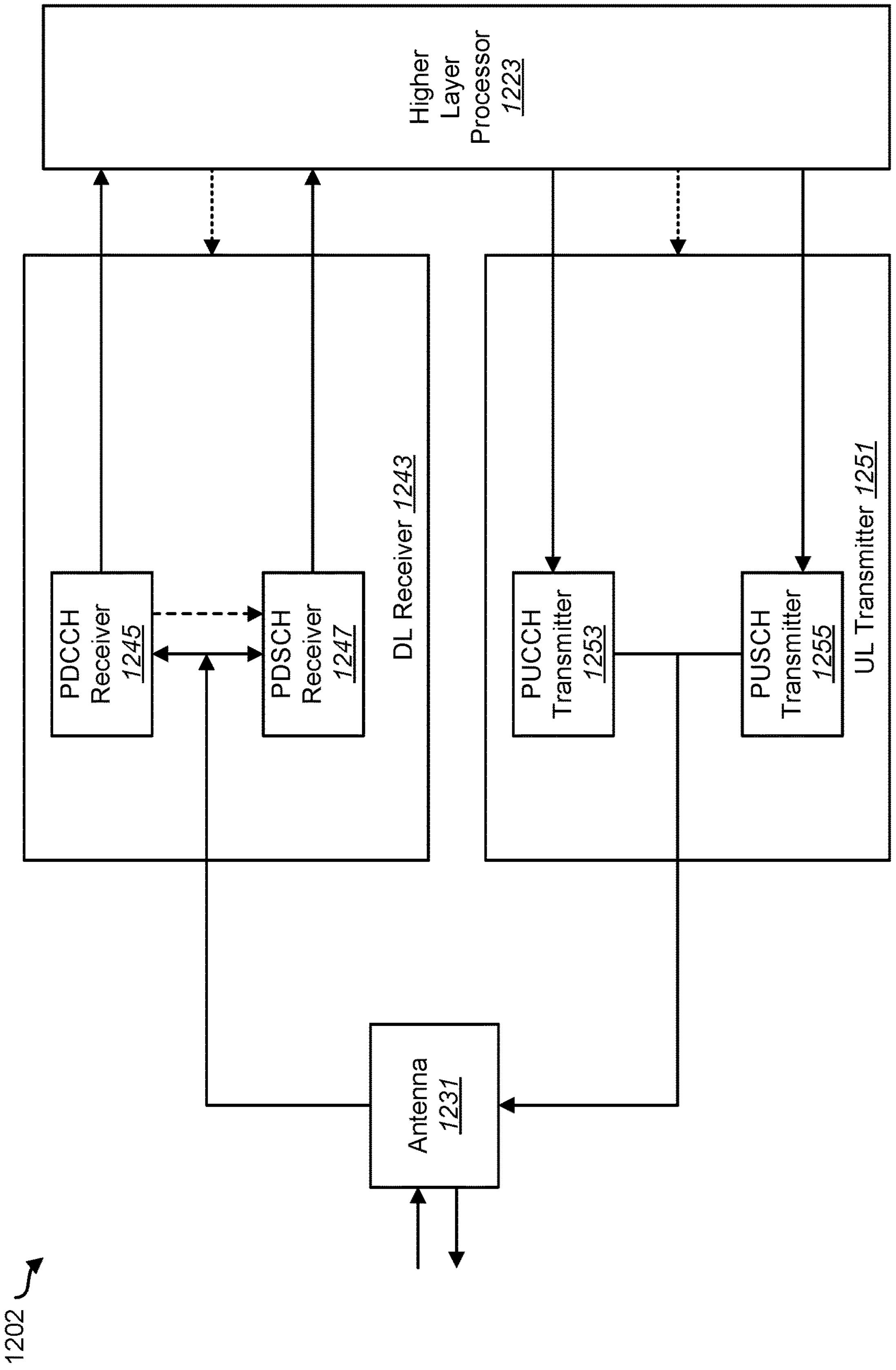
FIG. 8 is a block diagram illustrating one implementation of a wireless terminal.

FIG. 8 is a block diagram illustrating one implementation of a wireless terminal 1202. The wireless terminal 1202 may include a higher layer processor 1223, a UL transmitter 1251, a DL receiver 1243, and one or more antenna 1231. The UL transmitter 1251 may include a PUCCH transmitter 1253 and a PUSCH transmitter 1255. The DL receiver 1243 may include a PDCCH receiver 1245 and a PDSCH receiver 1247.

The higher layer processor 1223 may manage physical layer's behaviors (the UL transmitter's and the DL receiver's behaviors) and provide higher layer parameters to the physical layer. The higher layer processor 1223 may obtain transport blocks from the physical layer. The higher layer processor 1223 may send and/or acquire higher layer messages such as an RRC message and MAC message to and/or from a wireless terminal's higher layer. The higher layer processor 1223 may provide the PUSCH transmitter transport blocks and provide the PUCCH transmitter 1253 UCI.

The DL receiver 1243 may receive multiplexed downlink physical channels and downlink physical signals via receiving antennas 1231 and de-multiplex them. The PDCCH receiver 1245 may provide the higher layer processor 1223 DCI. The PDSCH receiver 1247 may provide the higher layer processor 1223 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 9:
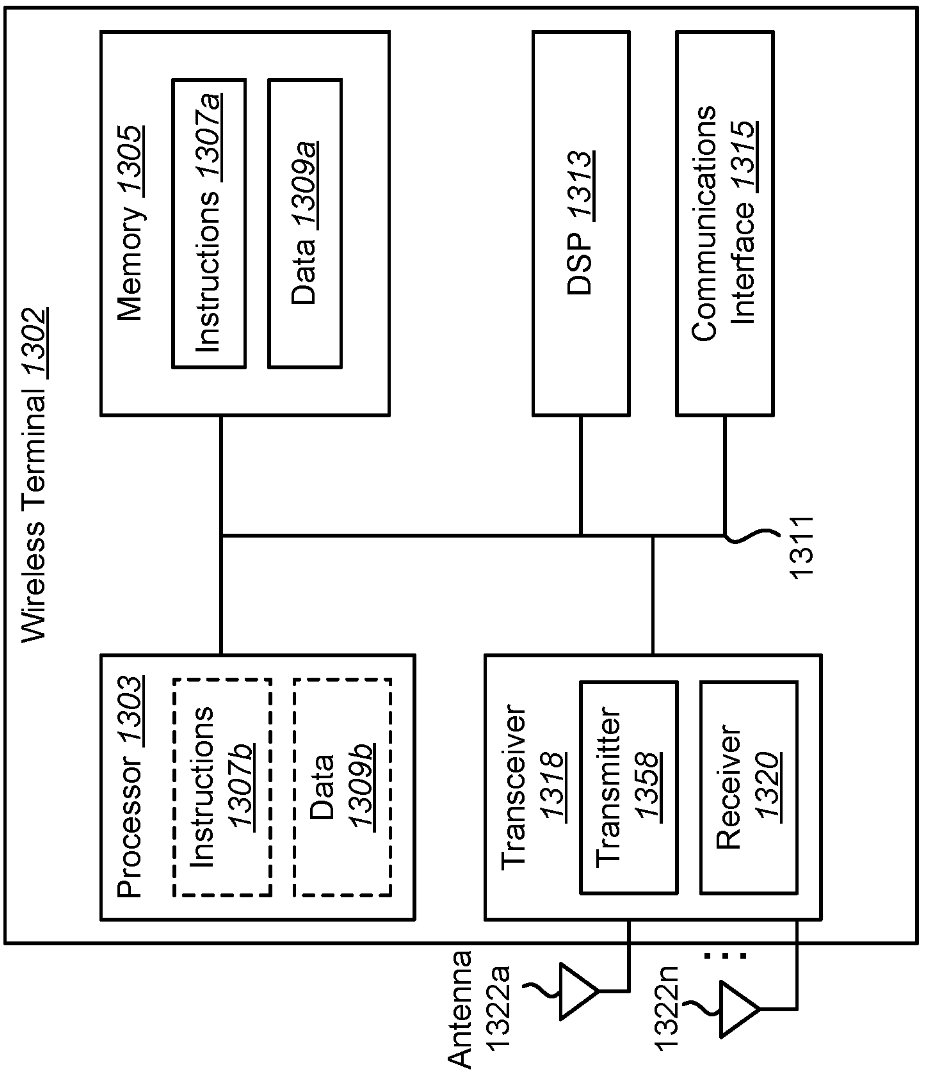
FIG. 9 illustrates various components that may be utilized in a wireless terminal.

FIG. 9 illustrates various components that may be utilized in a wireless terminal 1302. The wireless terminal 1302 described in connection with FIG. 9 may be implemented in accordance with the wireless terminal described herein. The wireless terminal 1302 includes a processor 1303 that controls operation of the wireless terminal 1302. The processor 1303 may also be referred to as a central processing unit (CPU). Memory 1305, which may include read-only memory (ROM), random access memory (RAM), a combination of the two or any type of device that may store information, provides instructions 1307*a* and data 1309*a* to the processor 1303. A portion of the memory 1305 may also include non-volatile random-access memory (NVRAM). Instructions 1307*b* and data 1309*b* may also reside in the processor 1303. Instructions 1307*b* and/or data 1309*b* loaded into the processor 1303 may also include instructions 1307*a* and/or data 1309*a* from memory 1305 that were loaded for execution or processing by the processor 1303. The instructions 1307*b* may be executed by the processor 1303 to implement the methods described above.

The wireless terminal 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322*a-n* are attached to the housing and electrically coupled to the transceiver 1318.

The various components of the wireless terminal 1302 are coupled together by a bus system 1311, which may include a power bus, a control signal bus and a status signal bus, in addition to a data bus. However, for the sake of clarity, the various buses are illustrated in FIG. 9 as the bus system 1311. The wireless terminal 1302 may also include a digital signal processor (DSP) 1313 for use in processing signals. The wireless terminal 1302 may also include a communications interface 1315 that provides user access to the functions of the wireless terminal 1302. The wireless terminal 1302 illustrated in FIG. 9 is a functional block diagram rather than a listing of specific components.

Figure 10:
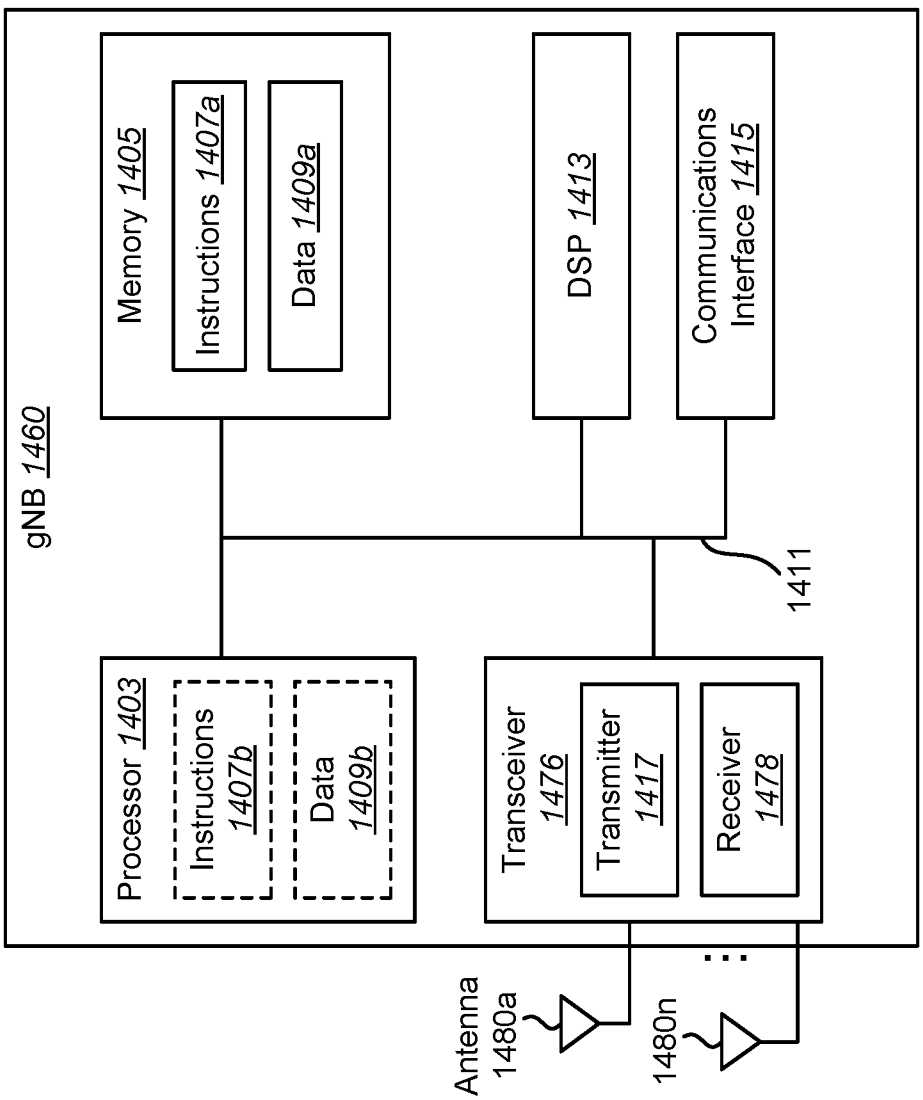
FIG. 10 illustrates various components that may be utilized in a gNB.

FIG. 10 illustrates various components that may be utilized in a gNB 1460. The gNB 1460 described in connection with FIG. 7 may be implemented in accordance with the gNB described herein. The gNB 1460 includes a processor 1403 that controls operation of the gNB 1460. The processor 1403 may also be referred to as a central processing unit (CPU). Memory 1405, which may include read-only memory (ROM), random access memory (RAM), a combination of the two or any type of device that may store information, provides instructions 1407*a* and data 1409*a* to the processor 1403. A portion of the memory 1405 may also include non-volatile random-access memory (NVRAM). Instructions 1407*b* and data 1409*b* may also reside in the processor 1403. Instructions 1407*b* and/or data 1409*b* loaded into the processor 1403 may also include instructions 1407*a* and/or data 1409*a* from memory 1405 that were loaded for execution or processing by the processor 1403. The instructions 1407*b* may be executed by the processor 1403 to implement the methods described above.

The gNB 1460 may also include a housing that contains one or more transmitters 1417 and one or more receivers 1478 to allow transmission and reception of data. The transmitter(s) 1417 and receiver(s) 1478 may be combined into one or more transceivers 1476. One or more antennas 1480*a-n* are attached to the housing and electrically coupled to the transceiver 1476.

The various components of the gNB 1460 are coupled together by a bus system 1411, which may include a power bus, a control signal bus and a status signal bus, in addition to a data bus. However, for the sake of clarity, the various buses are illustrated in FIG. 10 as the bus system 1411. The gNB 1460 may also include a digital signal processor (DSP) 1413 for use in processing signals. The gNB 1460 may also include a communications interface 1415 that provides user access to the functions of the gNB 1460. The gNB 1460 illustrated in FIG. 10 is a functional block diagram rather than a listing of specific components.

Figure 11:
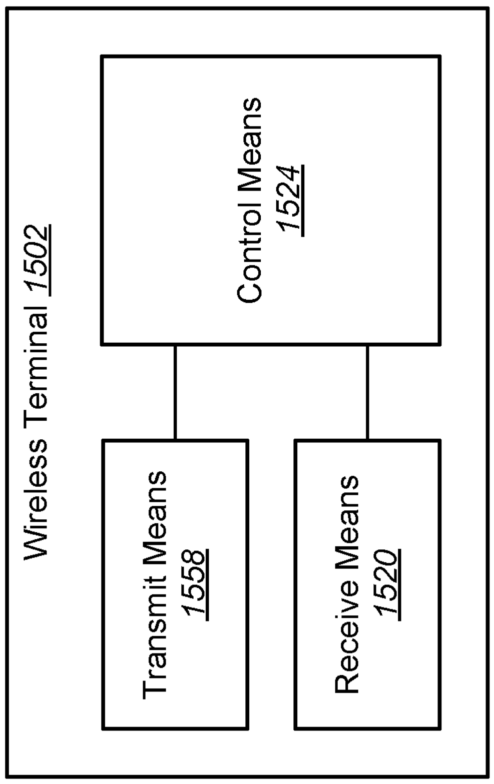
FIG. 11 is a block diagram illustrating one implementation of a wireless terminal in which the present systems and methods may be implemented.

FIG. 11 is a block diagram illustrating one implementation of a wireless terminal 1502 in which systems and methods for resource allocations of enhanced uplink transmissions may be implemented. The wireless terminal 1502 includes transmit means 1558, receive means 1520 and control means 1524. The transmit means 1558, receive means 1520 and control means 1524 may be configured to perform one or more of the functions described herein. FIG. 9 above illustrates one example of a concrete apparatus structure of FIG. 11. Other various structures may be implemented to realize one or more of the functions herein. For example, a DSP may be realized by software.

Figure 12:
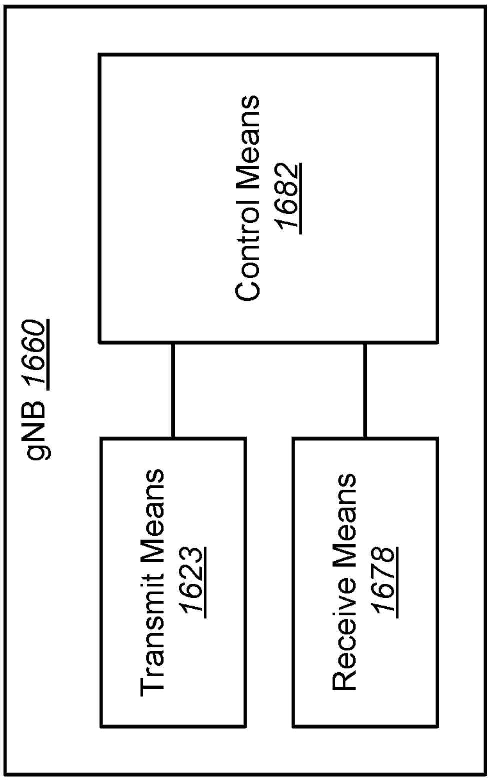
FIG. 12 is a block diagram illustrating one implementation of a gNB in which the present systems and methods may be implemented.

FIG. 12 is a block diagram illustrating one implementation of a gNB 1660 in which systems and methods for resource allocations of enhanced uplink transmissions may be implemented. The gNB 1660 includes transmit means 1623, receive means 1678 and control means 1682. The transmit means 1623, receive means 1678 and control means 1682 may be configured to perform one or more of the functions described herein. FIG. 10 above illustrates one example of a concrete apparatus structure of FIG. 12. Other various structures may be implemented to realize one or more of the functions described herein. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB or the wireless terminal according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB and the wireless terminal according to the systems and methods described above may be realized as an LSI that is a typical integrated circuit. Each functional block of the gNB and the wireless terminal may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

What is claimed is:

1. A wireless terminal, comprising:

transmitting circuitry configured to:

request non-terrestrial network (NTN) cell information from a core network node receiving circuitry configured to:

receive the NTN cell information from the core network node, wherein the NTN cell information comprises:

NTN ephemeris and location assistance data;

a NTN coverage start time; and

NTN cell configuration data; and processing circuitry configured to start cell selection/reselection based on the NTN coverage start time.

2. A core network node, comprising:

receiving circuitry configured to receive, from a wireless terminal, a request for non-terrestrial network (NTN) cell information;

transmitting circuitry configured to transmit the NTN cell information to a wireless terminal in response to the request, the NTN cell information comprising:

NTN ephemeris and location assistance data;

a NTN coverage start time; and

NTN cell configuration data; and wherein the NTN cell information is used by the wireless terminal to determine a time to start cell selection/reselection based on the NTN coverage start time.

* * * * *